US011509578B2

(12) United States Patent
Mardente et al.

(10) Patent No.: US 11,509,578 B2
(45) Date of Patent: Nov. 22, 2022

(54) FLEXIBLE POLICY SEMANTICS EXTENSIONS USING DYNAMIC TAGGING AND MANIFESTS

(71) Applicant: Cisco Technology, Inc., San Jose, CA (US)

(72) Inventors: Gianluca Mardente, San Francisco, CA (US); Shrey Ajmera, Milpitas, CA (US); Cheng Wang, San Jose, CA (US); Maithili Narasimha, Los Altos, CA (US); Aleksandr Oshurkov, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 16/713,650

(22) Filed: Dec. 13, 2019

(65) Prior Publication Data

US 2021/0182169 A1    Jun. 17, 2021

(51) Int. Cl.
*G06F 11/34* (2006.01)
*G06F 9/50* (2006.01)
(Continued)

(52) U.S. Cl.
CPC .......... *H04L 45/64* (2013.01); *G06F 9/5077* (2013.01); *H04L 41/0893* (2013.01);
(Continued)

(58) Field of Classification Search
CPC ......... H04L 45/64; H04L 45/70; H04L 45/60; H04L 45/58; H04L 43/08; G06F 11/3414;
(Continued)

(56) References Cited

U.S. PATENT DOCUMENTS 11,055,148 B2 * 7/2021 Barinov ............... G06F 9/5083
2014/0317293 A1 * 10/2014 Shatzkamer ........ G06F 9/45558
709/226
(Continued)

FOREIGN PATENT DOCUMENTS

EP    3035574 A1    6/2016

OTHER PUBLICATIONS

PCT Search Report and Written Opinion dated Feb. 16, 2021 for PCT Application No. PCT/US20/62732, 16 pages.
(Continued)

*Primary Examiner* — Phong La
(74) *Attorney, Agent, or Firm* — Lee & Hayes, P.C.

(57) ABSTRACT

This disclosure describes a method of utilizing network controllers to store mappings between policies, dynamic operating attributes (DOA), and trigger values in a manifest and utilizing software agents in communication to monitor DOAs of respective workloads or workload groupings for trigger values associated with the DOAs to apply a corresponding policy at run-time. The method provides for flexible policy semantics and on-demand policy provisioning. The method includes receiving at a network controller, a definition of a policy, a DOA associated with a workload, and a trigger value associated with the DOA, storing a mapping between the policy, DOA and trigger value, sending the DOA and the trigger value to a datapath agent monitoring respective workloads, receiving an indication that a current value of the DOA of the workload corresponds to the trigger value from the software agent, and sending the policy to the software agent for distribution to the workload.

20 Claims, 7 Drawing Sheets

(51) Int. Cl.
*H04L 45/64* (2022.01)
*H04L 41/0893* (2022.01)
*H04L 43/08* (2022.01)

(52) U.S. Cl.
CPC ............ *H04L 43/08* (2013.01); *G06F 9/5083* (2013.01); *G06F 11/3414* (2013.01)

(58) Field of Classification Search
CPC ............ G06F 11/3466; G06F 11/3438; G06F 11/3409; G06F 11/3433; G06F 11/3452; G06F 9/5083; G06F 9/505; G06F 9/5077; G06F 9/5061; G06F 9/455
See application file for complete search history.

(56) References Cited

U.S. PATENT DOCUMENTS

| | | | | |
|---|---|---|---|---|
| 2016/0164787 | A1* | 6/2016 | Roach | H04L 43/065 |
| | | | | 370/235 |
| 2017/0289047 | A1* | 10/2017 | Szilagyi | H04L 41/0853 |
| 2018/0123961 | A1* | 5/2018 | Farman | H04L 43/0888 |
| 2018/0287902 | A1* | 10/2018 | Chitalia | H04L 43/045 |
| 2019/0364116 | A1* | 11/2019 | Hiltunen | H04L 67/16 |
| 2020/0044943 | A1* | 2/2020 | Bor-Yaliniz | H04L 41/5025 |
| 2020/0192725 | A1* | 6/2020 | Feldkamp | G06F 9/5077 |

OTHER PUBLICATIONS

International Preliminary Report on Patentability for PCT Application No. PCT/US20/62732, dated Jun. 23, 2022, 10 pages.

\* cited by examiner

300 ⤹

```
kind:template
  name: low-qos-useg-template
  matchClass: fvAEPg
  properties:
    floodOnEncap: no
    descr: Welcome to cattle class
  namedRelations:
    name: toQosCustom
    targetClass: qosCustomPol
    type: dedicated
    template: loweredQosCustomPolTemplate
  security rules:
      contract.name: DenyFacebookEspnYoutube
      consumer.selector:* kind:selector
  name: AEPgManifest
  matchClass: fvAEPg
  matchExpression: priority!='critical', bandwidthUsage=='high', hours=='off-peak'
  microsegmentation:
      type: dedicated
      template: low-qos-useg-template
  matchExpression: app=='web', region=='us-west'
  security rules:
      contract.name: Allowhttp
      consumer.selector: app=='db'
  matchExpression: app=='web', region=='asia'
  security rules:
      contract.name: DenyAll
      consumer.selector: app=='db'
```

- `priority!='critical'` — USER DEFINED LABEL 302(1)
- `bandwidthUsage=='high'` — SYSTEM GENERATED LABEL 304(1)
- `hours=='off-peak'` — SYSTEM GENERATED LABEL 304(2)
- `template: low-qos-useg-template` — USER DEFINED LABEL 302(2)
- `app=='web'` — (linked to 302(2))
- `region=='us-west'` — SYSTEM GENERATED LABEL 304(3)
- `app=='db'` — USER DEFINED LABEL 302(3)
- `app=='web'` / `region=='asia'` — SYSTEM GENERATED LABEL 304(4)
- `app=='db'` — USER DEFINED LABEL 302(4)
- USER DEFINED LABEL 302(5)

FIG. 3

FLEXIBLE POLICY SEMANTICS EXTENSIONS USING DYNAMIC TAGGING AND MANIFESTS

TECHNICAL FIELD

The present disclosure relates generally to dynamically updating policies and regrouping endpoints to react to run-time events and other conditions in a network by utilizing system-generated dynamic tags, templates, and manifests.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. As datacenters keep getting bigger on-premises and expand to hybrid-cloud and multi-cloud environments, the need for improved policy and segmentation semantics continues to grow.

To support fine grain policy enforcement for applications, micro-segmentation techniques may be utilized to group workloads, or endpoints, in the network into micro-segments (or a group of endpoints that share common policy requirements). Micro-segmenting involves moving endpoints from a default or base endpoint group, into a specialized endpoint grouping depending on attributes of the endpoint. Some of these attributes may include a virtual machines guest operating system, Domain Name System (DNS), Subnetwork (subnet), Media Access Control (MAC) address, and/or Internet Protocol (IP) address. For example, endpoints meeting certain micro-segmentation criteria can be reclassified and grouped into micro-segmented endpoint groups that apply a different set of policies to the endpoints. While this provides for a technique to enforce more nuanced policies, the attributes currently relied on to regroup endpoints are limited as to the information they provide. Additionally, this information is inadequate to describe and classify container-based workloads.

Additionally, labels and selectors provide a mechanism to identify and classify container-based workloads. These labels and selectors can be utilized for physical as well as virtual based workloads in order to not only improve segmentation semantics, but also to drive a system toward intent-driven networks. However, labels are also fairly static user-assigned identifiers without active intervention, and thus do not reflect any run-time state information of workloads in the network. As such, while utilizing these techniques provide certain segmentation semantics, they do not support dynamic policy updates to react to certain conditions in the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example user manifest including user-defined labels and system-generated labels to assign and/or create different security policies and segmentation policies.

DESCRIPTION OF EXAMPLE EMBODIMENTS

Overview

Figure 1:
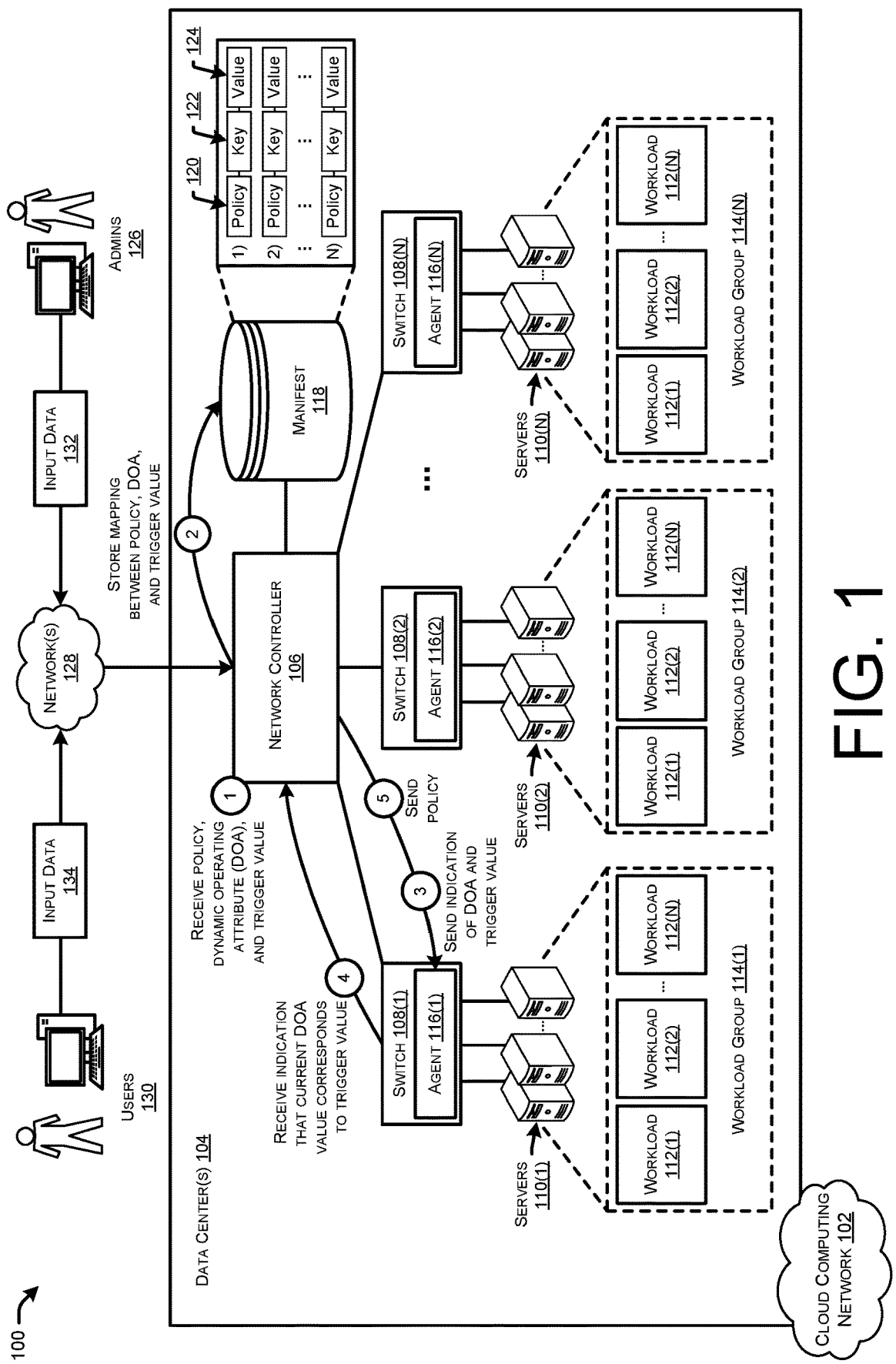
FIG. 1 illustrates a system-architecture diagram of an example flow for a cloud computing network having a network controller configured to store policy mappings in a manifest and communicate with network devices executing software agents to monitor dynamic tags associated with respective workloads and distribute dynamic policies at run-time.

This disclosure describes a method of utilizing network controllers to store mappings between policies, dynamic operating attributes, and trigger values in a manifest and utilizing software agents in communication to monitor dynamic operating attributes of respective workloads or workload groupings for trigger values associated with the dynamic operating attributes to apply a corresponding policy at run-time. The method includes receiving, at a Software-Defined-Networking (SDN) controller, a definition of a policy. The method may further include receiving, at the SDN controller, a dynamic operating attribute associated with a workload running in a network associated with the SDN controller. The method may further include receiving, at the SDN controller, a first indication of a trigger value associated with the dynamic operating attribute. The method may further include storing, in a manifest managed by the SDN controller, a mapping between the policy, the dynamic operating attribute, and the trigger value. The method may further include, sending, to a software agent running on an endpoint, a second indication of the dynamic operating attribute and the trigger value. The software agent may be configured to monitor the workload. The method may further include, receiving, at the SDN controller and from the software agent, a third indication that a current value of the dynamic operating attribute of the workload corresponds to the trigger value. The method may further include sending the policy to the software agent for distribution to the workload, based at least in part on receiving the third indication.

Additionally, or alternatively, the method includes applying, by a software agent running on an endpoint in a network, a first policy for a workload that the software agent is monitoring. The network may be associated with a Software-Defined-Networking (SDN) controller. The method may further include receiving, at the software agent, and from the SDN controller, a first indication of a dynamic operating attribute associated with a workload and a trigger value associated with the dynamic operating attribute. The trigger value may be associated with a second policy. The method may further include determining, by the software agent, that a current value of the dynamic operating attribute corresponds to the trigger value. The method may further include sending, to the SDN controller and from the software agent, a second indication that the current value of the dynamic operating attribute of the workload corresponds to the trigger value. The method may further include receiving, at the software agent and from the SDN controller, the second policy. The method may further include applying, by the software agent, the second policy for the workload that the software agent is monitoring.

Additionally, the techniques described herein may be performed by a system and/or device having non-transitory computer-readable media storing computer-executable instructions that, when executed by one or more processors, performs the method described above.

EXAMPLE EMBODIMENTS

Generally, a workload grouping (or an endpoint grouping) is designed to apply policies to all of the workloads (or endpoints) within the workload grouping. When a workload is instantiated, it is classified in a base workload grouping, and it will inherit the policies that are applied to that workload grouping. A workload grouping may contain one or more workloads that are intended to have the same network policies. Not all workloads utilize the same network policies, and thus there may be a need to differentiate policies between workload groups and the workloads contained within them. After being classified into a base workload grouping, micro-segmentation techniques may be utilized to classify a workload into a specialized workload grouping depending on attributes associated with the workload. These specialized groupings can vary and depend on different attributes such as, for example, a virtual machines guest operating system, Domain Name System (DNS), Sub-network, Media Access Control (MAC) address, and/or Internet Protocol (IP) address. Additional techniques may be utilized to identify and classify container-based workloads, such as, for example, utilizing labels and selectors. Labels and selectors not only improve micro-segmentation semantics, but also drive a networking system toward intent-driven networks. These micro-segmentation techniques allow users to easily group alike workloads, regardless of what the workloads are running and in which form-factor they are operating.

In an example, a workload may begin execution and be hosted in a cloud computing network, such as a network of devices in one or more datacenters that are controlled according to a Software Defined Networking (SDN) architecture. This SDN-based network may include one or more network controllers, where a network controller of the network controllers may be configured to communicate with a number of software agents operating in the SDN network. Software agents may be utilized to facilitate policy propagation from the network controllers to the workloads. Software agents may be configured to operate on a variety of different network elements within the fabric, thereby creating a datapath. For example, a software agent may be executing on an endpoint such as a physical server. Software agents can operate and reside on, as a non-limiting illustrative example, physical leaf switches in the on-premises fabric, virtual edge switches running on individual servers on-premises or in remote clouds of the fabric, cloud service routers in transit virtual private clouds, virtual machines carrying workloads both on-premises as well as off-site, etc. When the workload begins execution, the network controller may send an associated software agent the base workload grouping policies to classify the workload in the base grouping. Depending on attributes of the workload, the workload is moved to specialized grouping having a different set of policies. However, the attributes and labels relied on to regroup these workloads are fairly static user-defined identifiers without active intervention, they do not reflect any run-time state information. As such, these techniques do not support dynamic policy updates to react to run-time events and conditions within the network.

This disclosure describes techniques for network controllers to utilize dynamic tagging coupled with templates and manifests to provide useful run-time semantics utilized to improve workload grouping techniques and apply policy updates on the fly depending on various runtime conditions throughout an SDN network-controlled data-center fabric. According to the techniques and mechanisms described herein, dynamic tags can be generated by various datapath elements of the fabric and can be utilized with user defined tags as well as templates and manifests, allowing admins to express more robust micro-segmentation criteria to dynamically group workloads. Dynamic tags may be organized as key-value pairs, having keys corresponding to one or more of region of origin, leaf switch location, workload attributes, workload resource usage thresholds, active or inactive time epochs and thresholds, uptime, app-latency, app-behavior, and the like. Corresponding to each key is a well-defined set of acceptable values defined by the controller. While examples of dynamic keys are presented herein, the examples serve as a non-exhaustive list, and the dynamic tags that can be implemented may be system dependent. Software agents monitoring workloads within the fabric may receive from an associated network controller, indications of dynamic operating attributes (or a key), and associated trigger values (or a value). These key-value pairs are defined in a manifest accessible by the network controller and are mapped to a specific policy. Software agent(s) may monitor workloads for these dynamic operating attributes, and once the value of a dynamic operating attribute satisfies one of the associated trigger values, the responsible agent may notify the associated controller. In response the controller may determine that a current value of a dynamic operating attribute of a workload has reached an associated trigger value, the workload requires a new policy and may be regrouped accordingly. The policy may be enforced by the software agent(s) and/or other network elements, such that the workload is subject to a different set of network policies and/or experience.

In some examples, a network admin may provide a manifest defining one or more policies to a network controller of the network. Additionally, or alternatively, the network controller may manage a manifest, and receive policies from the network admin. The network controller may store in the manifest, a mapping between a policy, a Dynamic Operating Attribute (DOA) associated with a workload running in a network that is associated with the network controller, and a trigger value associated with the DOA. The manifest may store the mapping as a key-value pair. In some examples, the DOA may be the key of the key-value pair, and the trigger value may be the value of the key-value pair.

Then, the one or more policies may be configured to be dynamically applied to various workloads in the network in response to run-time events and/or other various network conditions. In some examples, the network controller may send to a software agent monitoring a workload grouping, an indication of a DOA associated with a workload that the software agent is to monitor. In some examples, the network controller may send, to the software agent monitoring the workload grouping, another indication of a trigger value associated with the DOA. In some examples, the software agent may monitor workloads in the grouping to identify when the current value of a DOA of a workload reaches and/or exceeds a defined trigger value. In some examples, a policy may be configured to be applied to a workload when a current value of a specified DOA reaches a defined trigger value. In some examples, when the current value of a specified DOA reaches a defined trigger value, the software agent may send an indication to the network controller, indicating that the current value of the DOA corresponds to the trigger value. The network controller may then determine to apply the policy to the workload, based on the current value of the DOA corresponding to the trigger value, and may send the policy to the software agent to be applied to the workload. The software agent may then apply the policy to the workload. Additionally, or alternatively, the software agent may be configured to monitor the workload for a change in the current value of the DOA, and send an indication to the network controller, indicating that the current value of the DOA has changed. The network controller may then make a determination as to whether or not a current value of the DOA satisfies an associated trigger value and may send the policy to the software agent to apply the policy to the workload. The software agent may then apply the policy to the workload.

The DOA may be used to monitor various attributes of the workload, such as, but not limited to, resource usage values, particular geographic regions associated with the network, a resource usage value ratio of a first workload consuming resources on an endpoint compared to a resource usage value ratio of a second workload consuming resources on the endpoint, and/or a latency value associated with the performance of a workload, hours of operation for the workload (e.g., peak hours or not peak hours), bandwidth usage values, etc. For example, the DOA may be a resource usage value of a workload, for example, CPU usage, and an associated trigger value may be defined as 80%. Thus, the policy may be applied to the workload if the CPU usage of the workload reaches or exceeds 80% of its total capacity. Additionally, or alternatively, the policy may be applied to the workload if the CPU usage of the workload falls below 80% of its total capacity. Additionally, or alternatively, the manifest may define multiple trigger values associated with a DOA. For example, a first policy may correspond to the first trigger value of 80%, and a second policy may correspond to a second trigger value of 90%. Thus, the second policy may be applied to the workload if the CPU usage of the workload reaches or exceeds 90%. In some examples, multiple DOA's may be monitored so an admin may implement more complex policy semantics. For example, a first DOA may be a latency value associated with the performance of a workload, and an associated trigger value may be defined as 10 milliseconds (ms), configured such that when the current latency value of a workload exceeds 10 ms, a new policy may be applied to the workload. Additionally, or alternatively, a second DOA may be a particular geographic region where the workload is operating, and an associated trigger value may be defined as 'Asia,' configured such that when the current region of a workload is 'Asia,' a new policy may be applied to the workload. Additionally, or alternatively, a policy may be configured to be applied to a workload when the current value of the first DOA and the current value of the second DOA satisfy their corresponding trigger values.

In some examples, the dynamic tags are represented as key-value pairs. In some examples, a key-value pair representing a dynamic tag may be inserted using various methods. In some examples, a key-value pair representing a dynamic tag may be included in a control packet, such as for example, an endpoint update message, and can be sent from a software agent to the network controller directly. Additionally, or alternatively, the control packet including a key-value pair representing a dynamic tag can be sent from a software agent to other network elements on the route to the network controller. Additionally, or alternatively, a key-value pair representing a dynamic tag may be included in packet headers in the datapath. In some examples, a key-value pair representing a dynamic tag may be included in a Virtual Extensible Local Area Network Generic Protocol Extension (VXLAN-GPE) packet header. For example, the tag value and the tag key may be represented by reserved bits in the VXLAN-GPE header. In some examples, the tag value may be included in the reserved bits 8-23 of the first word VXLAN-GPE header. In some examples, the tag key may be included in the reserved bits 24-31 of the second word of the VXLAN-GPE header. Additionally, or alternatively, a key-value pair representing a dynamic tag may be included in a Generic Network Virtualization Encapsulation (GENEVE) packet header. For example, the tag value and the tag key may be represented by the variable length option bits of the GENEVE header.

In some examples, user manifests may be utilized for segmentation techniques described herein. In some examples, user manifests may include user-defined labels and system generated labels to assign and/or create different security policies and/or segmentation policies for the network. In some examples, the security policies may include an Access-Control List (ACL), such that an ACL may include a list of specific IP addresses, subnets, and protocols that are allowed as well as many that are not allowed. In some examples, manifests may define dynamic tags, which the software agents are capable of tracking and embedding in the system. In some examples, the dynamic tags may be ephemeral, and/or generated when certain run-time conditions are met. For example, if a specified state changes, the dynamic tags will be changed and/or removed to reflect the state change. For example, the resource usage, in terms of bandwidth, may be monitored at an endpoint. The resource usage may be marked as high, and the corresponding endpoint may be subjected to a policy enforcing a lower quality of experience. When the resource usage returns to a normal, or average state, the endpoint may be returned to its normal quality of experience policies. For example, user admins and fabric admins may use dynamic system-generated tags in a manifest to precisely identify and/or regroup endpoints. In some examples, the dynamic tags utilized in a manifest may express intent as to how the endpoints of the fabric must behave. Additionally, or alternatively, the dynamic tags utilized in a manifest may allow for dynamic policy updates when certain run-time conditions, as indicated by the dynamic tags, are met. In some examples, admins can utilize templates to automate the creation of micro-segmented endpoint groups. For example, endpoints identified by micro-segmented endpoint groups can be moved dynamically in and out of the micro-segmented endpoint groups that are created as a part of the template based on a policy defined in the manifest. In some examples, the network controller may utilize dynamic tags defined in the manifest to inform relevant datapath agents to monitor and embed corresponding system-generated tags for specific workflows. In some examples, dynamic tags can be defined in the manifest to be enabled at various levels of granularity. For example, the dynamic tags can be expressed at a tenant level, an application level, an endpoint (or workload) grouping level, and/or an individual endpoint (or workload) level.

The techniques described herein provide various improvements with respect to policy and segmentation semantics using dynamic tagging coupled with templates and manifests in datacenter environments. For instance, the techniques described herein may improve micro-segmentation or workload grouping techniques and allow policies to be applied to various workloads in a network in response to run-time events and/or other various network conditions. Additionally, these policies need not be pre-created or pre-provisioned on any devices within the network until run-time conditions, specified by the dynamic tags, are met in the network. By utilizing dynamic tags, users can use a combination of tags to express intent on how the endpoints of the fabric must behave using templates and manifests in a more intuitive and concise manner.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example flow for monitoring operating attributes and dynamically applying policy updates within a cloud computing network 102. The cloud computing network 102 may comprise one or more data centers 104 that include various network devices, such as, network controller(s) 106, switches 108(1)-(N), and/or physical servers 110(1)-(N) where N is any integer greater than "1." In some examples, the data center(s) 104 may be located across geographic areas, and the cloud computing network 102 may be a distributed network through which users (often customers) may interact via user devices to manage or otherwise interact with service provided by the cloud computing network 102.

The cloud computing network 102 may provide on-demand availability of computing system resources of physical server(s) 110(1)-(N), such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources of physical server(s) 110(1)-(N) in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services.

In some examples, physical servers may host one or more virtual machines. Each virtual machine may be configured to execute one of various operations and act as one or more virtual components for the cloud computing network 102, such as, for example, one or more workloads 112(1)-(N), where N is any integer greater than "1." In some examples, the physical server(s) 110 may host any number of virtual machines. In some examples, one or more workload(s) 112 may be spread across a number of physical servers 110. In some examples, each of the workloads 112(1)-(N) in the cloud computing network 102 may be included in a workload grouping 114(1)-(N), which may include workloads 112(1)-(N) hosted across separate physical servers 110(1)-(N) in the cloud computing network.

In some examples, a network controller 104 may be configured to communicate with the one or more physical servers 110(1)-(N) utilizing one or more network switches 108(1)-(N) configured to route communications to one or more workloads 112(1)-(N) in the cloud computing network 102. The network switches 108(1)-(N) may be hosting software agents 114(1)-(N) executing thereon. The one or more software agents 116(1)-(N) may be configured to monitor respective workloads 112(1)-(N) and/or workload groupings 114(1)-(N). Additionally, or alternatively, a network controller 104 may be configured store policies in a manifest 118 for later distribution to one or more of the workloads 112(1)-(N) and/or workload groupings 114(1)-(N), in response to runtime events and/or other network conditions in the cloud computing network 102. The manifest 118 may include one or more mappings. The one or more mappings may include a policy 120 mapped to one or more key-value pairs 122, 124. The one or more key(s) 122(1)-(N) may include one or more dynamic operating attributes associated with the one or more workloads 112(1)-(N) and/or workload groupings 114(1)-(N). The one or more value(s) 124(1)-(N) may include one or more trigger values associated with the one or more dynamic operating attributes.

Generally, the number of mappings in the manifest 118 may scale based on administrative users 126 interacting with the cloud computing network 102, such as administrators managing the operation of the cloud computing network 102 or other entities that interact with the cloud computing network 102 via respective administrative user devices. The administrative user devices may be any type of computing device capable of connecting to the cloud computing network 102 via a suitable data communications network 128, such as, but not limited to, a laptop or desktop computer, a tablet computing device, a server computer, a television, or a mobile telephone. Additionally, or alternatively, the number of workloads 112(1)-(N) may scale based on a number of users 130 interacting with the cloud computing network 102. The users 130 may comprise one or more of individual users, groups of users, organizations, businesses, or other entities that interact with the cloud computing network 102, might also connect with, manage, and utilize resources provided by the cloud computing network 102 in a similar fashion.

The administrative users 126 may provide input data 132 via the network(s) 128 to interact with the network controller 106 and provide new policies 120(1)-(N) to be added to the manifest 118. For example, the administrative user(s) 126 may submit a policy 120(1) mapped to a defined key-value pair 122(1), 124(1). In some examples, the network controller 106 may consume the policy 120(1), key 122(1), and value 124(1), and store a mapping in the manifest 118. Additionally, or alternatively, the administrative users 126 may provide a manifest 118 defining one or more policies 120(1)-(N) to a network controller 106 in the cloud computing network 102.

The users 130 may provide input data 134 via the network(s) 128 to interact with a service that is supported by the workloads 112(1)-(N) running on the servers 110(1)-(N), and/or included in the workload groupings 114(1)-(N). For example, the users 130 may submit requests to process data, retrieve data, store data, and so forth such that virtual machines hosting the workloads 112(1)-(N) are spun up or spun down to process the requests based on demand.

When an application begins execution in a cloud computing network 102, micro-segmentation techniques are utilized to group the workload 112 executing on a physical server 110 into a default or base workload group 114. In some examples, a workload 112 may be identified and reclassified into a specialized workload group 114, depending on attributes associated with the workload 112. For example, workloads 112(1)-(N) may be classified into specialized workload groups 114(1)-(N) that are configured to be monitored by respective software agents 116(1)-(N) for defined dynamic operating attributes associated with the workloads 112(1)-(N). The software agents 116(1)-(N) may monitor the workloads 112(1)-(N) and apply a different set of policies 120(1)-(N) to the workloads 112(1)-(N) therein, in response to various run-time conditions associated with the workloads 112(1)-(N). In some examples, the dynamic operating attributes may include, but are not limited to, resource usage values, particular geographic regions associated with the network, a resource usage value ratio of a first workload 112(1) consuming resources on an endpoint compared to a resource usage value ratio of a second workload 112(2) consuming resources on the endpoint, and/or a latency value associated with the performance of a workload 112, hours of operation for the workload 112 (e.g., peak hours or not peak hours), bandwidth usage values, etc.

In some examples, a software agent 116 running on a networking device, such as, for example, a network switch 108 may monitor dynamic operating attributes of one or more workloads 112(1)-(N) and/or workload groups 114(1)-(N) in response to runtime events and/or other conditions in the cloud computing network 102. For example, administrative users 126 may provide one or more policies 120(1)-(N), and/or a manifest 118 including one or more policies 120(1)-(N) to a network controller 106. The network controller 106 may maintain the manifest 118 and store new policies 120 received from administrative users 126 in the manifest 118. These policies 120 may be applied to workloads 112 and/or workload groups 114 when conditions defined in the manifest 118 are met. In some examples, a mapping between a policy 120(1) and a key-value pair 122(1), 124(1) may be stored in the manifest. In some examples, a key 122 may correspond to a dynamic operating attribute associated with a workload 112 and/or a workload group 114 running in the cloud computing network 102, and a value 124 may correspond to a trigger value associated with the dynamic operating attribute.

For example, a key 122(1) corresponding to a policy 120(1) may define that the dynamic operating attribute that is to be monitored is the CPU usage of a workload 112(1) and/or workload group 114(1), and the value 124(1) may define the trigger value as a threshold of 70% of the total CPU. Thus, the mapping defines that when the current value of the CPU usage of a workload 112(1) and/or workload group 114(1), as defined by the key 122(1), reaches or exceeds the trigger value of 70%, as defined by the value 124(1), then the policy 120(1) may be applied to the workload 112(1) and/or workload group 114(1).

Additionally, or alternatively, a key 122(1) corresponding to a policy 120(1) may define that the dynamic operating attribute that is to be monitored is the current geographic region from which a workload 112(1) and/or workload group 114(1) is hosted, and the value 124(1) may define the trigger value as a particular geographic region from amongst a group of geographic regions associated with the network, such as, for example, 'Asia.' Thus, the mapping defines that when the current geographic region from which the workload 112(1) and/or workload group 114(1) is hosted, as defined by the key 122(1), satisfies the trigger value of 'Asia,' as defined by the value 124(1), then the policy 120(1) may be applied to the workload 112(1) and/or workload group 114(1).

Additionally, or alternatively, a key 122(1) corresponding to a policy 120(1) may define that the dynamic operating attribute that is to be monitored is a current resource usage value ratio of a first workload 112(1) consuming resources on an endpoint compared to a resource usage value ratio of a second workload 112(2) and/or the other workloads 112(2)-(N) in the workload group 114(1) consuming resources on the endpoint, and the value 124(1) may define the trigger value as a 2:1 ratio. Thus, the mapping defines that when the current resource usage value ratio of the first workload 112(1) consuming resources on an endpoint compared to a resource usage value ratio of a second workload 112(2) and/or the other workloads 112(2)-(N) in the workload group 114(1) consuming resources on the endpoint, as defined by the key 122(1), satisfies the trigger value of a 2:1 ratio, as defined by the value 124(1), then the policy 120(1) may be applied to the workload 112(1) and/or workload group 114(1).

Additionally, or alternatively, a key 122(1) corresponding to a policy 120(1) may define that the dynamic operating attribute that is to be monitored is a current latency value associated with the performance of a workload 112(1) and/or workload group 114(1), and the value 124(1) may define the trigger value as a threshold latency of 10 milliseconds (ms). Thus, the mapping defines that when the current latency value associated with the performance of the workload 112(1) and/or workload group 114(1), as defined by the key 122(1), satisfies the trigger value of a latency value of 10 ms, as defined by the value 124(1), then the policy 120(1) may be applied to the workload 112(1) and/or workload group 114(1).

In some examples, the network controller 106 may send an indication of the key 122 and the value 124 to one or more software agents 116 monitoring the one or more workloads 112 and/or workload groups 114. In some examples, the key-value pair 122, 124 representing a dynamic tag may be inserted using various methods. For example, a key-value pair 122, 124 representing a dynamic tag may be included in a control packet, such as for example, an endpoint update message, and can be sent from a software agent 116 to the network controller 106 directly. Additionally, or alternatively, the control packet including a key-value pair 122, 124 representing a dynamic tag can be sent from a software agent 116 to other network elements on the route to the network controller 106. Additionally, or alternatively, a key-value pair 122, 124 representing a dynamic tag may be included in packet headers in the datapath. In some examples, a key-value pair 122, 124 representing a dynamic tag may be included in a Virtual Extensible Local Area Network Generic Protocol Extension (VXLAN-GPE) packet header. For example, the tag value 124 and the tag key 122 may be represented by reserved bits in the VXLAN-GPE header. In some examples, the tag value 124 may be included in the reserved bits 8-23 of the first word VXLAN-GPE header. In some examples, the tag key 122 may be included in the reserved bits 24-31 of the second word of the VXLAN-GPE header. Additionally, or alternatively, a key-value pair 122, 124 representing a dynamic tag may be included in a Generic Network Virtualization Encapsulation (GENEVE) packet header. For example, the tag value 124 and the tag key 122 may be represented by the variable length option bits of the GENEVE header.

In some examples, when the key-value pair 122, 124 is sent to the software agent(s) 116, the software agent(s) 116 may then monitor the current value of a dynamic operating attribute of the workload(s) 112 and/or workload group(s) 114, defined by the key 122. For example, when the current value of the dynamic operating attribute of the workload(s) 112 and/or workload group(s) 114, defined by the key 122, satisfies a trigger value, defined by the value 124, the software agent 116 may provide an indication to the network controller 106. Additionally, or alternatively, one or more trigger values may be defined by the values 124 in the manifest 118, such that when the current value of the dynamic operating attribute of the workload(s) 112 and/or workload group(s) 114 satisfies the one or more trigger values defined by the values 124, the software agent 116 may provide one or more indications corresponding to the one or more trigger values, to the network controller 106. Additionally, or alternatively, the software agent(s) 116 may be configured to monitor multiple dynamic operating attributes of a workload 112 and/or workload group 114, defined by respective key(s) 122. In some examples, when the network controller 106 receives an indication from a software agent 116, indicating that a current value of a dynamic operating element of a workload 112 and/or workload group 114, defined by the key 122, corresponds to a trigger value defined by the value 124, the network controller 106 may send the policy that is mapped to the key-value pair 122, 124 in the manifest 118 to the software agent 116 from which the indication was received. The software agent 116 may then apply the policy 120 to the workload 112 and/or workload group 114.

At "1," the network controller 106 may receive, from an administrative user 126, a definition of a policy 120(1). Additionally, or alternatively, the network controller 106 may receive, from an administrative user 126, a key 122(1) defining a dynamic operating attribute associated with a workload 112(1) running in the cloud computing network 102. Additionally, or alternatively, the network controller 106 may receive, from an administrative user 126, a value 124(1) defining a trigger value associated with the dynamic operating attribute.

At "2," the network controller 106, may store, in a manifest 118, a mapping between the policy 120(1), the key 122(1), and the value 124(1).

At "3," the network controller 106, may send to a software agent 116(1) operating on a network switch 108(1) and configured to monitor at least the workload 112(1), an indication of the key 122(1), defining the dynamic operating attribute, and the value 124(1), defining the trigger value. Additionally, or alternatively, the software agent 116(1) may be operating on any other networking device within the cloud computing network 102, such as, for example, one of the physical servers 110(1) executing the workload 112(1).

At "4," the software agent 116(1) may determine that the current value of the dynamic operating attribute associated with the workload 112(1), as defined by the key 122(1), corresponds to the trigger value, as defined by the value 124(1). The software agent 116(1) may send, to the network controller 106, an indication that the current value of the dynamic operating attribute associated with the workload 112(1) corresponds to the trigger value.

At "5," the network controller 106 may send, based at least in part on the current value of the dynamic operating attribute associated with the workload 112(1) corresponding to the trigger value, the policy 120(1) to the software agent 116(1) for distribution to at least the workload 112(1). Additionally, or alternatively, the software agent 116(1) may distribute the policy 120(1) to the workload group 114(1).

Figure 2A:
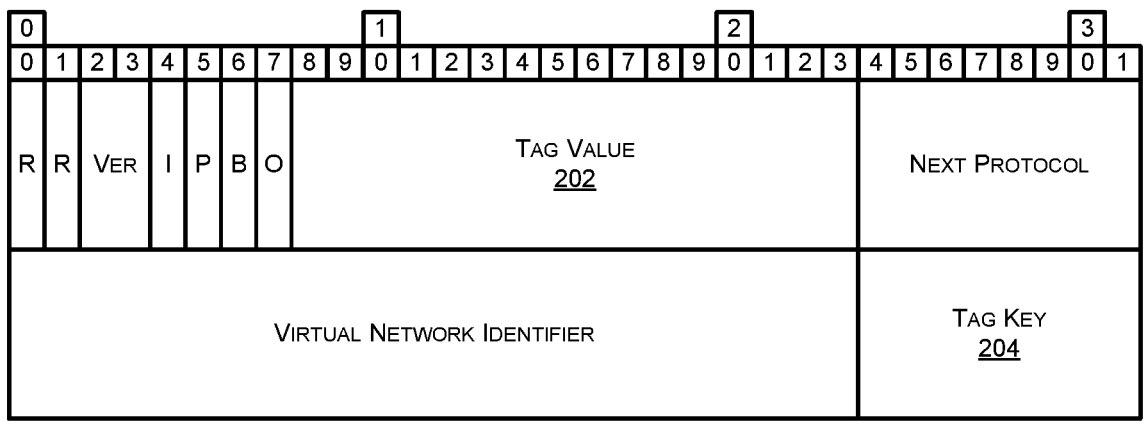
FIG. 2A illustrates a diagram of an example Virtual Extensible Local Area Network Generic Protocol Extension (VXLAN-GPE) packet header including a dynamic tag key and value.

FIG. 2A illustrates a diagram 200 of an example Virtual Extensible Local Area Network Generic Protocol Extension (VXLAN-GPE) packet header including a dynamic tag value 202 and tag key 204. The dynamic tag value 202 and tag key 204 may include the same or similar attributes of the value 124 and key 122 from FIG. 1.

In some examples, a key-value pair 204, 202 representing a dynamic tag may be included in a Virtual Extensible Local Area Network Generic Protocol Extension (VXLAN-GPE) packet header. For example, the tag value 202 and the tag key 204 may be represented by reserved bits in the VXLAN-GPE header. In some examples, the tag value 202 may be included in the reserved bits 8-23 of the first word VXLAN-GPE header. In some examples, the tag key 204 may be included in the reserved bits 24-31 of the second word of the VXLAN-GPE header. In some examples, the tag key 204 and the tag value 202 may be mapped to a compact representation using only a few bits of the in the VXLAN-GPE packet header.

Figure 2B:
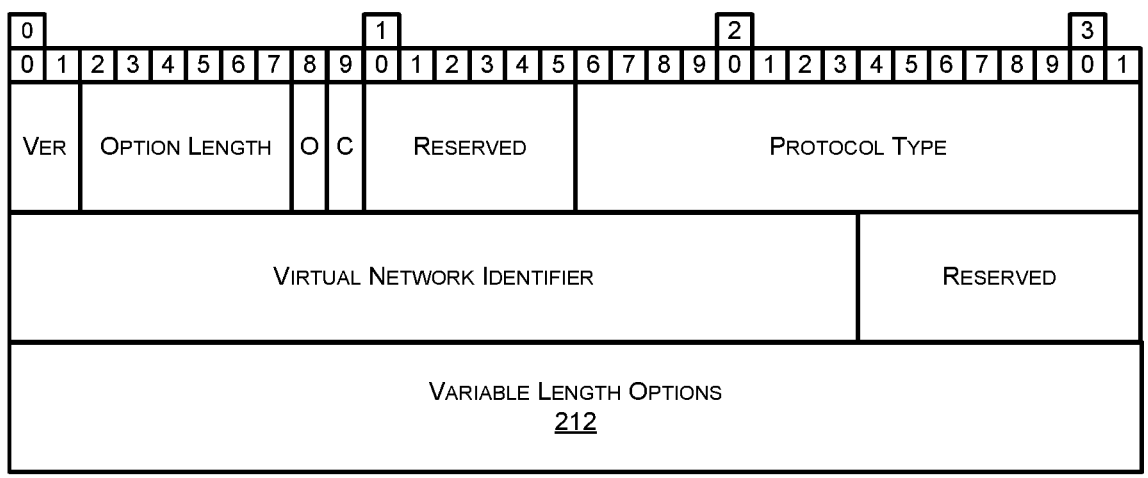
FIG. 2B illustrates a diagram of an example Generic Network Virtualization Encapsulation (GENEVE) packet header including a dynamic tag key and value.

FIG. 2B illustrates a diagram 210 of an example Generic Network Virtualization Encapsulation (GENEVE) packet header including a dynamic tag value and key value included in the variable length options 212 of the GENEVE packet header. The dynamic tag value and tag key included in the variable length options 212 may include the same or similar attributes of the value 124 and key 122 from FIG. 1.

In some examples, a key-value pair representing a dynamic tag may be included in a Generic Network Virtualization Encapsulation (GENEVE) packet header. For example, the tag value and the tag key may be represented by the variable length options 212 bits of the GENEVE header. In some examples, the tag key and the tag value included in the variable length options 212 may be mapped to a compact representation using only a few bits of the in the GENEVE packet header.

FIG. 3 illustrates an example user manifest 300 user-defined labels and system-generated labels to assign and/or create different security policies and segmentation policies for the cloud computing network 102.

In some examples, a user manifest 300 may include one or more user defined label(s) 302(1)-(5). Additionally, or alternatively, the user manifest 300 may include one or more system generated labels 304(1)-(4). In some examples, the system generated label(s) 304(1)-(4) may define dynamic tags that allow the system to apply policy updates when certain run-time conditions are met. In some examples, the user defined labels 302(1)-(5) may be used in combination with system generated labels 304(1)-(4) such that security policies may be assigned to a workload 112 and/or workload group 114. For example, the security policies may include an Access-Control List (ACL), such that an ACL may include a list of specific IP addresses, subnets, and protocols that are allowed as well as many that are not allowed. In some examples, the user defined labels 302(1)-(5) may be used in combination with system generated labels 304(1)-(4) such that an administrative user can more precisely identify and regroup endpoints (or workloads). For example, the user defined label 302(1), system generated label 304(1), and/or system generated label 304(2) may be used to define a micro-segmentation policy.

For example, the user defined label 302(1) defines the priority level, that was statically assigned to the workload 112 and/or workload group 114, as the tag key 122 to monitor, and the trigger value of 'critical,' as the tag value 124 to monitor. Additionally, or alternatively, the system generated label 304(1) may define the current bandwidth usage associated with the operation of a workload 112 and/or workload group 114 as the dynamic tag key 122 to monitor, and the trigger value of 'high,' as the corresponding dynamic tag value 124 to monitor. Additionally, or alternatively, the system generated label 304(2) may define the current hours associated with the operation of the workload 112 and/or workload group 114 as the dynamic tag key 122 to monitor, and the trigger value of 'off-peak,' as the dynamic tag value 124 to monitor. In some examples, if of any combination of at least one of the user defined label 302(1), system generated label 304(1), and system generated label 304(2) has a trigger value that is met, the system may then apply the corresponding policy 120 to the associated workload(s) 112 and/or workload group(s) 114. In some examples, the policy 120 applied to the associated workload(s) 112 and/or workload group(s) 114 may be defined by the template field in the manifest.

Additionally, or alternatively, the user defined labels 302(2)-(5) and/or the system generated labels 304(3) and 304(4) may be used to define a security rules policy. For example, the user defined label 302(2) and 302(4) may define the application to monitor, as statically assigned to the workload, as the tag key 122 to monitor, and the trigger value of 'web,' as the tag value 124 to monitor. Additionally, or alternatively, the system generated label 304(3) and 304(4) may define the current region associated with the operation of the workload as the dynamic tag key 122 to monitor, and the system generated labels 304(3), 304(4) may define different trigger values as the tag value 124 to monitor and apply different security rules policies accordingly. For example, system generated label 304(3) may define the trigger value of 'us-west,' as the tag value 124 to monitor, and the system generated label 304(4) may define the trigger value of 'asia' as the tag value 124 to monitor. In some examples, when a current region associated with the operation of a workload satisfies the tag value 124 of 'us-west,' as defined by the system generated label 304(3), the workload may inherit the contract name 'Allowhttp,' as defined by the security rules. Additionally, or alternatively, when a current region associated with the operation of a workload satisfies the tag value 124 of 'asia,' as defined by the system generated label 304(4), the workload may inherit the contract name 'Denyall,' as defined by the security rules.

Figure 4:
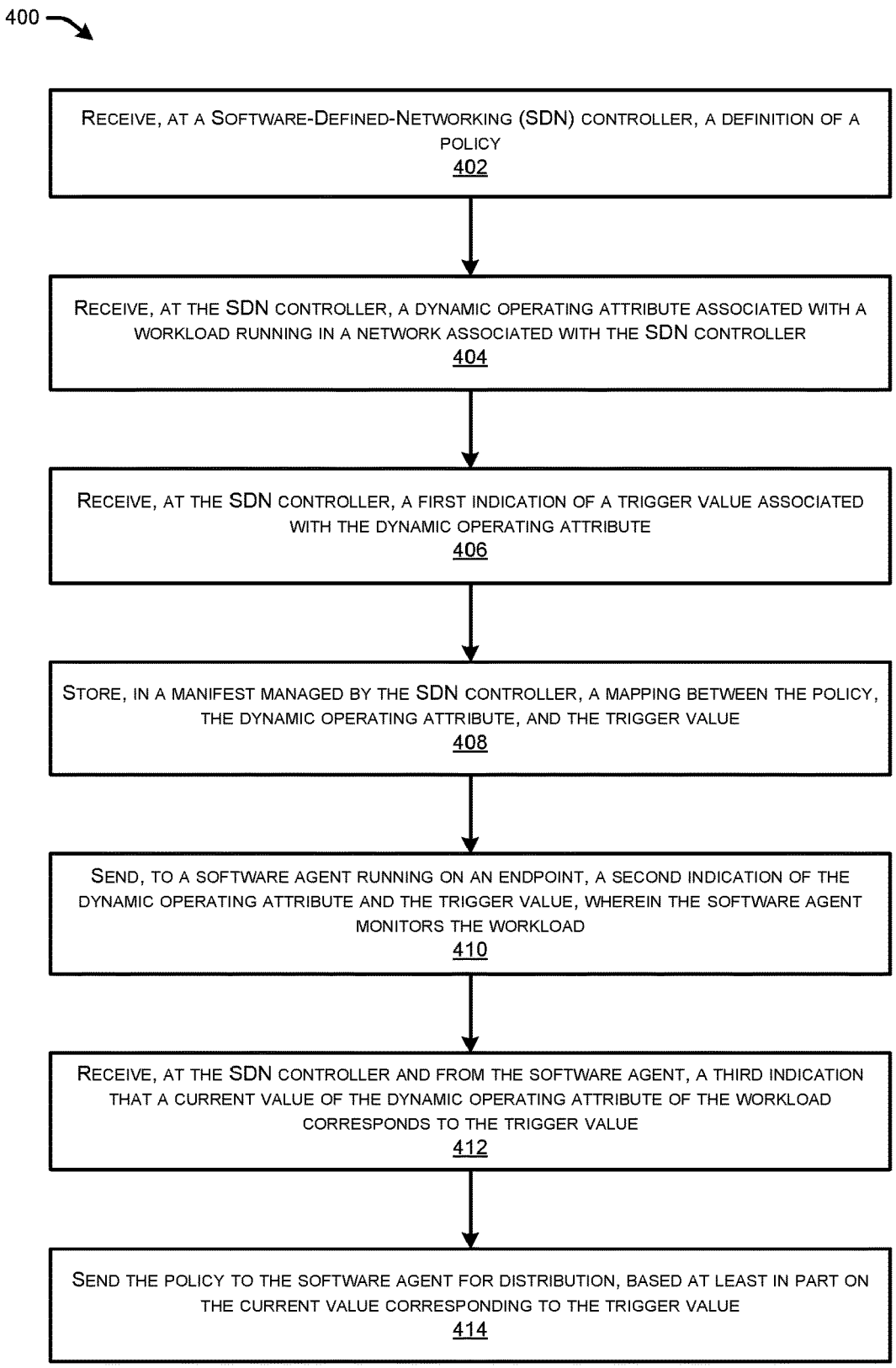
FIG. 4 illustrates a flow diagram of an example method for network controllers of a cloud computing network to receive a definition of a policy, a dynamic operating attribute (DOA), and a trigger value, store a mapping between the policy, DOA, and the trigger value, and utilize software agents monitoring respective workloads to determine when a policy should be applied to a workload group at run-time.
Figure 5:
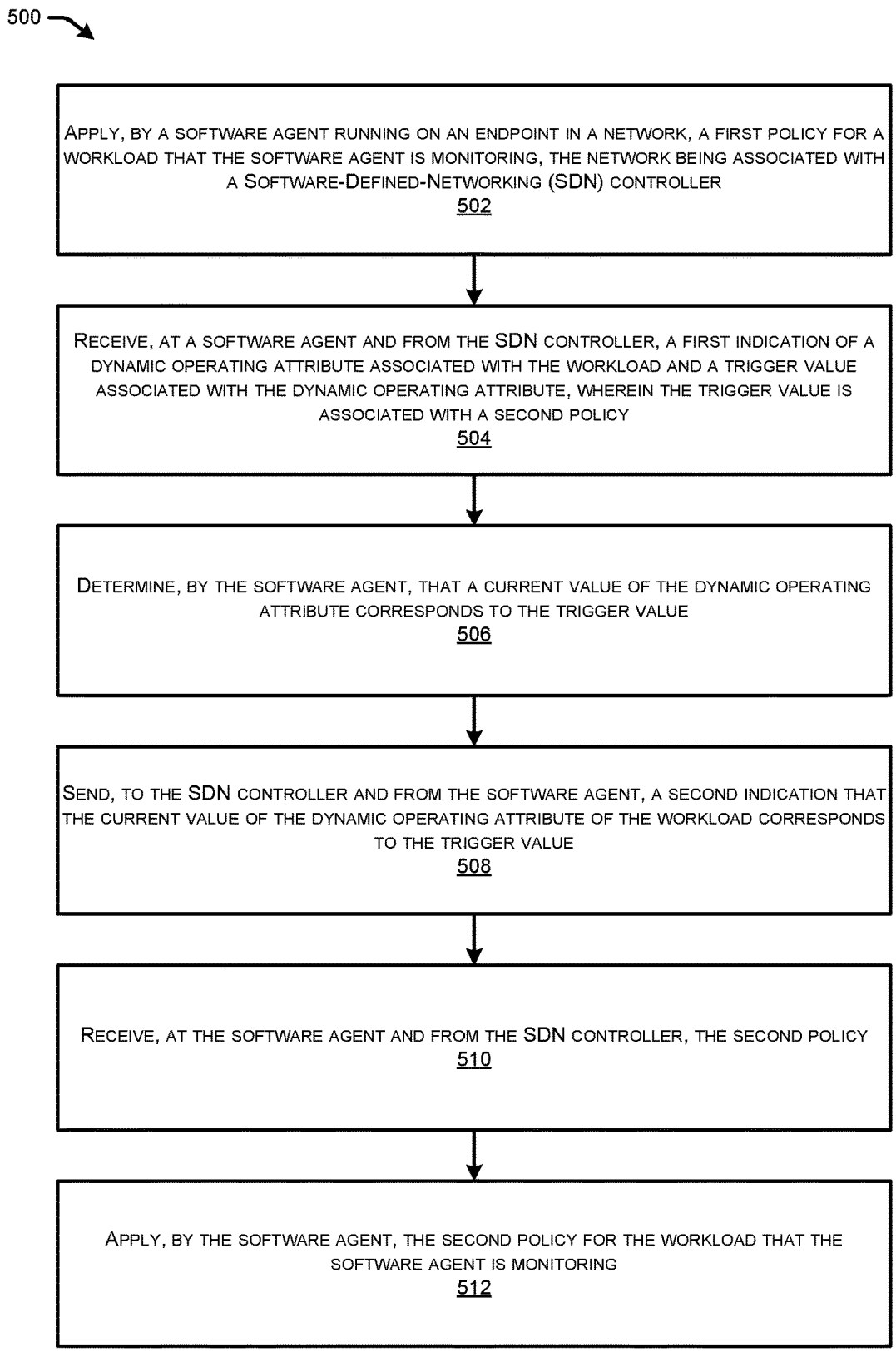
FIG. 5 illustrates a flow diagram of an example method for software agent(s) included in a cloud computing network to receive a policy with an associated key-value pair and monitor dynamic operating attributes of respective workloads, defined by the key, for a trigger value, defined by the value, and notify a network controller to apply a corresponding policy in response to run-time events.

FIGS. 4 and 5 illustrate flow diagrams of example methods 400 and 500 that illustrate aspects of the functions performed at least partly by the cloud computing network 102 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for network controller(s) 106 of a cloud computing network 102 to receive a definition of a policy 120, a key 122 defining dynamic operating attribute (DOA), and value 124 defining a trigger value, store a mapping between the policy 120, key 122, and the value 124 in a manifest 118, and utilize software agent(s) 116 monitoring respective workload(s) 112 and/or workload groups 114 to determine when a policy 120 should be applied to workload(s) 112 and/or workload group(s) 114 at run-time.

At 402, the network controller 106 of the cloud computing network 102 may receive a definition of a policy 120(1). Additionally, or alternatively, the network controller 106 may receive a manifest 118 including a definition of a policy 120(1).

At 404, the network controller 106 of the cloud computing network 102 may receive a dynamic operating attribute associated with a workload 112 running in the cloud computing network 102. Additionally, or alternatively, the network controller 106 may receive a manifest 118 including a dynamic operating attribute associated with a workload 112(1) and/or workload group 114(1). In some examples, the dynamic operating attribute is defined by a key 122.

At 406, the network controller 106 of the cloud computing network 102 may receive an indication of a trigger value associated with the dynamic operating attribute. Additionally, or alternatively, the network controller 106 may receive a manifest 118 including an indication of a trigger value associated with the dynamic operating attribute. In some examples, the trigger value is defined by a value 124(1).

At 408, the network controller 106 of the cloud computing network 102 may store, in the manifest 118, a mapping between the policy 120(1), the dynamic operating attribute, defined by the key 122(1), and the trigger value, defined by the value 124(1).

At 410, the network controller 106 of the cloud computing network 102 may send, to a software agent 116(1) operating on a network switch 108(1) in the cloud computing network 102 and monitoring the workload 112(1) and/or workload group 114(1), an indication of the dynamic operating attribute, defined by the key 122, and the trigger value, defined by the value 124.

At 412, the network controller 106 of the cloud computing network 102 may receive, from the software agent 116(1), an indication that a current value of the dynamic operating attribute of the workload 112(1), as defined by the key 122(1), corresponds to the trigger value, as defined by the value 124(1).

At 414, the network controller 106 of the cloud computing network 102 may send, to the software agent 112(1), the policy 120(1), based at least in part on the current value of the dynamic operating attribute of the workload 112(1), as defined by the key 122(1), corresponding to the trigger value, as defined by the value 124(1).

FIG. 5 illustrates a flow diagram of an example method 500 for software agent(s) 116 included in a cloud computing network 102 to receive a policy 120 with an associated key-value pair 122, 124 and monitor dynamic operating attributes of respective workloads 112, defined by the key 122, for a trigger value, defined by the value 124, and notify a network controller 106 to apply a corresponding policy 120 in response to run-time events.

At 502, a software agent 116(1) operating on a network switch 108(1) in the cloud computing network 102 may apply a first policy for a workload 112(1) and/or workload group 114(1) that the software agent 116(1) is monitoring. In some examples, the cloud computing network 102 is associated with a network controller 106.

At 504, the software agent 116(1) may receive, from a network controller 106, an indication of the dynamic operating attribute, defined by a key 122(1), and the trigger value, defined by a value 124(1). In some examples, prior to receiving the indication, an administrative user 126 may send, to a network controller 106 of a cloud computing network 102, a definition of a second policy 120(1). Additionally, or alternatively, the administrative user 126 may send, to the network controller 106, a manifest 118 including a definition of a second policy 120(1). Additionally, or alternatively, the administrative user 126 may send, to a network controller 106 of a cloud computing network 102, a dynamic operating attribute associated with a workload 112(1) and/or workload group 114(1) running in the cloud computing network 102. Additionally, or alternatively, the administrative user 126 may send, to the network controller 106, a manifest 118 including a dynamic operating attribute associated with the workload 112(1) and/or workload group 114(1). In some examples, the dynamic operating attribute may be defined by the key 122(1). Additionally, or alternatively, the administrative user 126 may send, to a network controller 106 of a cloud computing network 102, an indication of a trigger value associated with the dynamic operating attribute. Additionally, or alternatively, the administrative user 126 may send, to the network controller 106, a manifest 118 including an indication of a trigger value associated with the dynamic operating attribute. In some examples, the trigger value is defined by a value 124(1).

At 506, the software agent 116(1) may determine that a current value of the dynamic operating attribute of the workload 112(1), as defined by the key 122(1), corresponds to the trigger value, as defined by the value 124(1).

At 508, the software agent 116(1) may send, to the network controller 106 of the cloud computing network 102, an indication that a current value of the dynamic operating attribute of the workload 112(1), as defined by the key 122(1), corresponds to the trigger value, as defined by the value 124(1).

At 510, the software agent 116(1) may receive, from the network controller 106 of the cloud computing network 102, the second policy 120(1).

At 512, the software agent 116(1) may apply, to the workload 112(1) and/or workload group 114(1) that the software agent 116(1) is monitoring, the second policy 120(1).

In some examples, the workload 112(1) and/or workload grouping 114(1) may be reclassified into a new workload group 114(2)-(N), based at least in part on the second policy 120(1).

Figure 6:
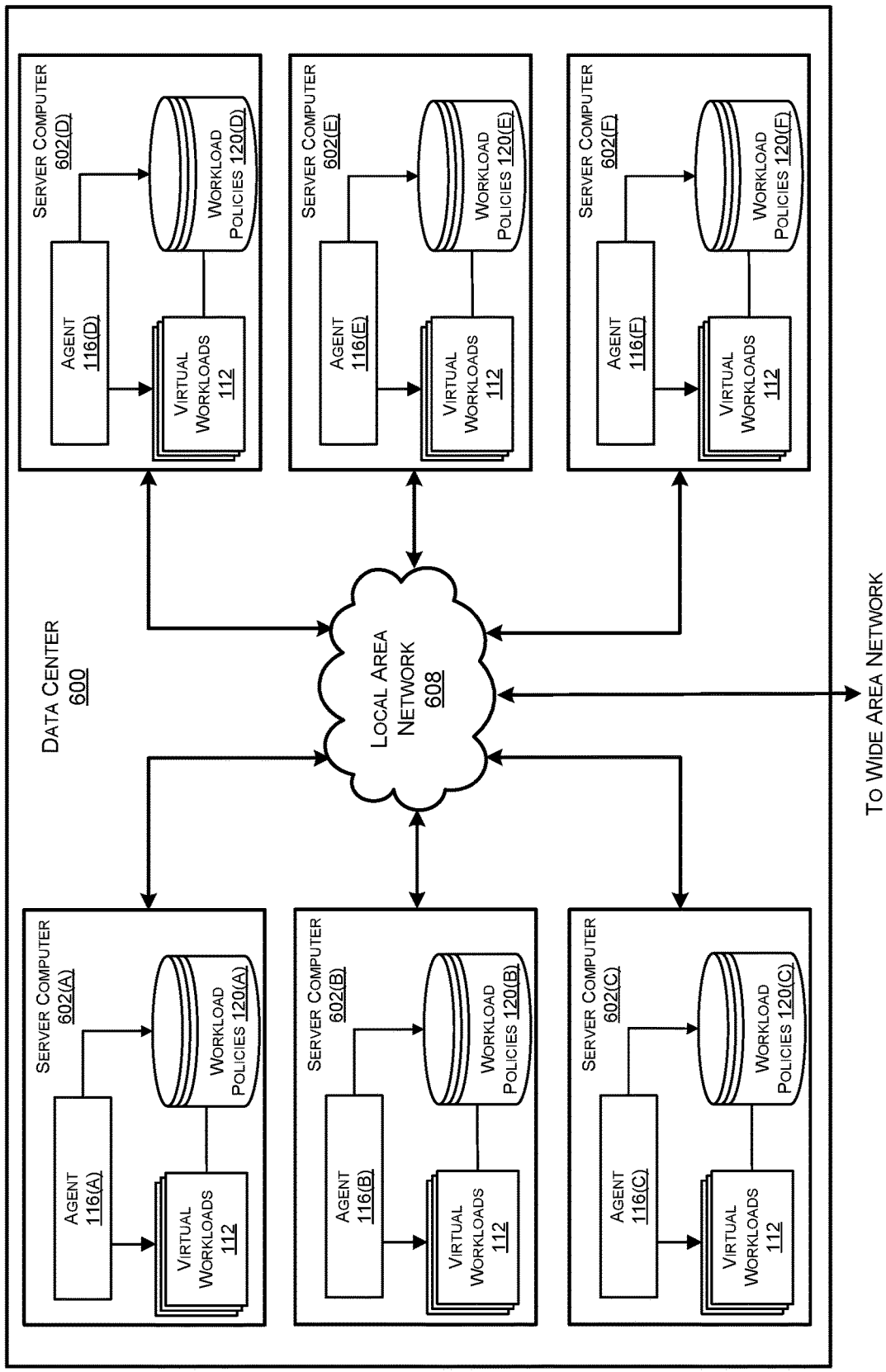
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers 110 described herein.

The server computers 602 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more workloads 112 that support a service or application provisioned across a set or cluster of servers 602. The workloads 112 on each server computer 602 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 6.

Figure 7:
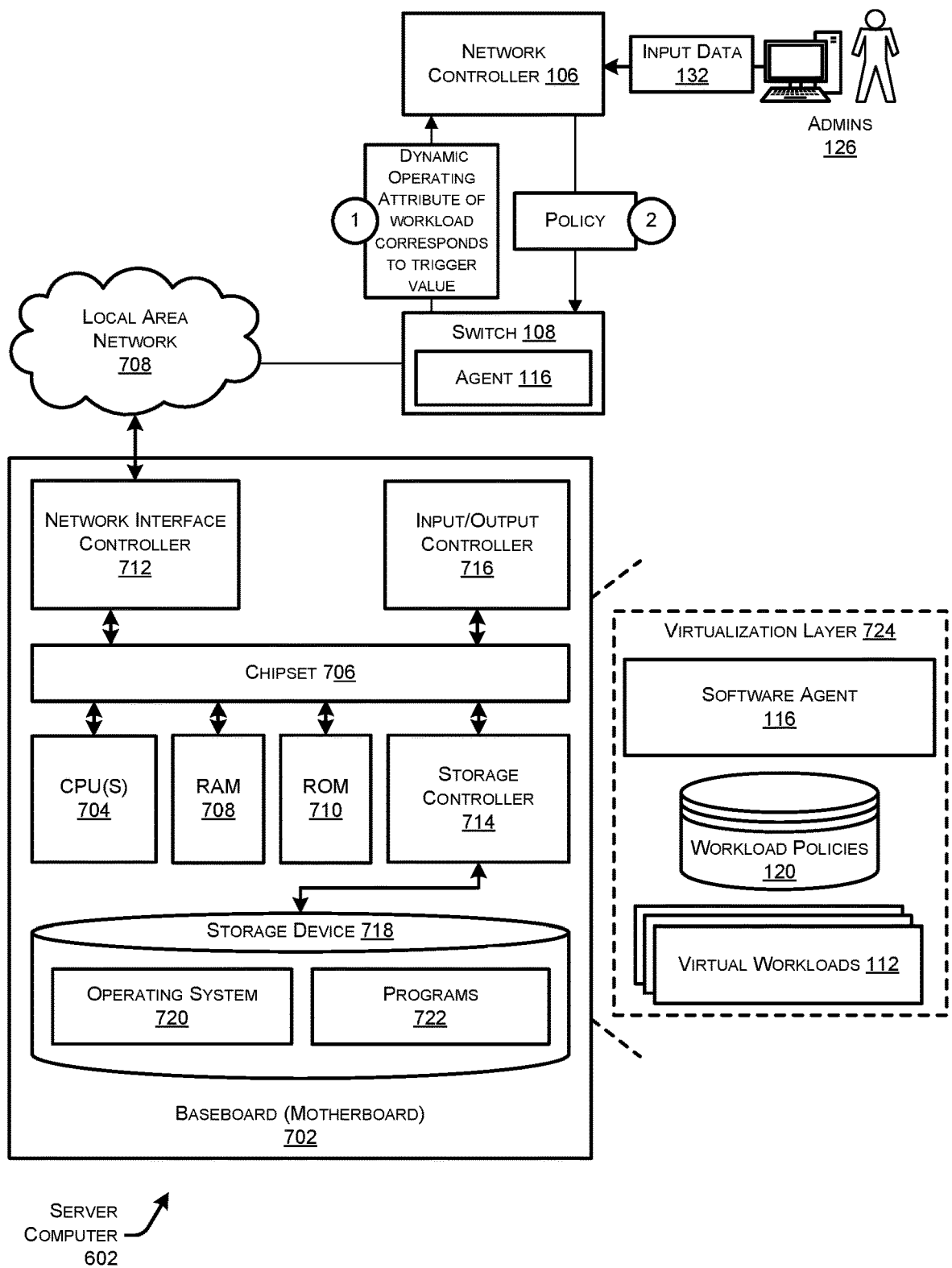
FIG. 7 is a computer architecture diagram showing an illustrative computer hardware architecture for implementing a server device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to a physical server 110 described herein.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network 708, such as the network 608. The chipset 706 can include functionality for providing network connectivity through a NIC 712, such as a gigabit Ethernet adapter. The NIC 712 is capable of connecting the computer 702 to other computing devices over the network 708 (or 128). It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units.

The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by the cloud computing network 102, and or any components included therein, may be supported by one or more devices similar to computer 602. Stated otherwise, some or all of the operations performed by the cloud computing network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

The server computer 602 may support a virtualization layer 724, such as one or more workloads 112 executing on the server computer 602. In some examples, the virtualization layer 724 may be supported by a hypervisor that provides one or more virtual machines running on the server computer 602 to perform functions described herein. The virtualization layer 724 may generally support a virtual resource that performs at least portions of the techniques described herein. The network controller 106 may send and receive various data and provide it to a software agent 116 operating on a network switch 108. For instance, the network controller may receive a definition of a policy 120, a dynamic operating attribute associated with a workload 112, defined by a key 122, and/or a trigger value associated with the dynamic operating attribute, defined by a value 124. Additionally, or alternatively, the network controller 106 may receive an indication that a current value of a dynamic operating attribute associated with a workload 112, defined by a key 122, corresponds to a trigger value, defined by a value 124. In some examples, the network controller 106 may send a policy 120 to the software agent 116.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative embodiments that fall within the scope of the claims of the application.

What is claimed is:

1. A method comprising:
   receiving, at a Software-Defined-Networking (SDN) controller, a definition of a policy;
   receiving, at the SDN controller, a dynamic operating attribute associated with a workload running in a network associated with the SDN controller;
   receiving, at the SDN controller, a first indication of a first trigger value associated with the dynamic operating attribute and a second trigger value associated with the dynamic operating attribute, wherein the second trigger value is different from the first trigger value;
   storing, in a manifest managed by the SDN controller, a first mapping between the policy, the dynamic operating attribute, and the first trigger value and a second mapping between the policy, the dynamic operating attribute, and the second trigger value;
   sending, to a software agent running on an endpoint, a second indication of the dynamic operating attribute, the first trigger value, and the second trigger value, wherein the software agent monitors the workload;
   receiving, at the SDN controller and from the software agent, a third indication that a current value of the dynamic operating attribute of the workload corresponds to one of the first trigger value or the second trigger value; and
   based at least on the current value corresponding to one of the first trigger value or the second trigger value, the first mapping, and the second mapping, sending the policy to the software agent for distribution to the workload.

2. The method of claim 1, wherein:
the first trigger value includes a threshold resource usage value associated with the workload; and
the current value of the dynamic operating attribute comprises a current resource usage value of the workload that at least one of exceeds the threshold resource usage value or falls below the threshold resource usage value.

3. The method of claim 1, wherein:
the first trigger value includes an indication of a particular geographic region from amongst a group of geographic regions associated with the network; and
the current value of the dynamic operating attribute of the workload indicates that the workload is running on the endpoint that is located in the particular geographic region.

4. The method of claim 1, wherein:
the workload comprises a first workload associated with a first customer account;
the endpoint is running a second workload associated with a second customer account;
the first trigger value includes a threshold resource usage value ratio for the first workload consuming computing resources of the endpoint compared to the second workload consuming the computing resources of the endpoint; and
the current value of the dynamic operating attribute of the workload comprises a current resource usage ration of the first workload that is equal to or greater than the threshold resource usage ratio.

5. The method of claim 1, wherein:
the first trigger value includes a threshold latency value associated with performance of the workload; and
the current value of the dynamic operating attribute of the workload indicates that a current latency value for the workload is greater than or equal to the threshold latency value.

6. A system comprising:
one or more processors; and
one or more non-transitory computer-readable media storing computer-executable instructions that, when executed by the one or more processors, cause the one or more processors to perform operations comprising:
receiving, at a Software-Defined-Networking (SDN) controller, a definition of a policy;
receiving, at the SDN controller, a dynamic operating attribute associated with a workload running in a network associated with the SDN controller;
receiving, at the SDN controller, a first indication of a first trigger value associated with the dynamic operating attribute and a second trigger value associated with the dynamic operating attribute, wherein the second trigger value is different from the first trigger value;
storing, in a manifest managed by the SDN controller, a first mapping between the policy, the dynamic operating attribute, and the first trigger value and a second mapping between the policy, the dynamic operating attribute, and the second trigger value;
sending, to a software agent running on an endpoint, a second indication of the dynamic operating attribute, the first trigger value, and the second trigger value, wherein the software agent monitors the workload;
receiving, at the SDN controller and from the software agent, a third indication that a current value of the dynamic operating attribute of the workload corresponds to one of the first trigger value or the second trigger value; and
based at least on the current value corresponding to one of the first trigger value or the second trigger value, the first mapping, and the second mapping, sending the policy to the software agent for distribution to the workload.

7. The system of claim 6, wherein the receiving the third indication comprises receiving, from the software agent, the third indication indicating that a current value of the dynamic operating attribute of the workload has changed, and the operations further comprising determining, at the SDN controller, that the current value of the dynamic operating attribute corresponds to another trigger value associated with the dynamic operating attribute.

8. The system of claim 6, wherein:
the first trigger value includes a threshold resource usage value associated with the workload; and
the current value of the dynamic operating attribute comprises a current resource usage value of the workload that at least one of exceeds the threshold resource usage value or falls below the threshold resource usage value.

9. The system of claim 6, wherein:
the first trigger value includes an indication of a particular geographic region from amongst a group of geographic regions associated with the network; and
the current value of the dynamic operating attribute of the workload indicates that the workload is running on the endpoint that is located in the particular geographic region.

10. The system of claim 6, wherein:
the workload comprises a first workload associated with a first customer account;
the endpoint is running a second workload associated with a second customer account;
the first trigger value includes a threshold resource usage value ratio for the first workload consuming computing resources of the endpoint compared to the second workload consuming the computing resources of the endpoint; and
the current value of the dynamic operating attribute of the workload comprises a current resource usage ration of the first workload that is equal to or greater than the threshold resource usage ratio.

11. The system of claim 6, wherein:
the first trigger value includes a threshold latency value associated with performance of the workload; and
the current value of the dynamic operating attribute of the workload indicates that a current latency value for the workload is greater than or equal to the threshold latency value.

12. The system of claim 6, wherein:
the first trigger value includes a range of values indicating a time of day associated with the performance of the workload; and
the current value of the dynamic operating attribute of the workload indicates that a current time of day for the workload is within the range of values indicating the time of day associated with the workload.

13. The system of claim 6, wherein the dynamic operating attribute comprises a first dynamic operating attribute and the current value comprises a first current value, and the operations further comprising:

receiving, at the SDN controller, a second dynamic operating attribute associated with the workload, wherein the first dynamic operating attribute is different from the second dynamic operating attribute;

receiving, at the SDN controller, a fourth indication of a third trigger value associated with the second dynamic operating attribute;

storing, in the manifest managed by the SDN controller, a third mapping between the policy, the second dynamic operating attribute, and the third trigger value;

sending, to the software agent, a fifth indication of the second dynamic operating attribute and the third trigger value;

receiving, at the SDN controller and from the software agent, a sixth indication that a second current value of the second dynamic operating attribute of the workload corresponds to the third trigger value; and wherein sending the policy to the software agent for distribution to the workload is based, at least on, the second current value corresponding to the third trigger value and the second mapping.

14. A method comprising:

applying, by a software agent running on an endpoint in a network, a first policy for a workload that the software agent is monitoring, the network being associated with a Software-Defined-Networking (SDN) controller;

receiving, at the software agent and from the SDN controller, a first indication of a dynamic operating attribute associated with the workload, a first trigger value associated with the dynamic operating attribute, and a second trigger value associated with the dynamic operating attribute, wherein the first trigger value and the second trigger value are associated with a second policy;

determining, by the software agent, that a current value of the dynamic operating attribute corresponds to one of the first trigger value or the second trigger value;

sending, to the SDN controller and from the software agent, a second indication that the current value of the dynamic operating attribute of the workload corresponds to one of the first trigger value or the second trigger value;

receiving, at the software agent and from the SDN controller in response to sending the second indication, the second policy; and applying, by the software agent, the second policy for the workload that the software agent is monitoring.

15. The method of claim 14, wherein:
the first trigger value includes a threshold resource usage value associated with the workload; and
the current value of the dynamic operating attribute comprises a current resource usage value of the workload that at least one of exceeds the threshold resource usage value or falls below the threshold resource usage value.

16. The method of claim 14, wherein:
the first trigger value includes an indication of a particular geographic region from amongst a group of geographic regions associated with the network; and
the current value of the dynamic operating attribute of the workload indicates that the workload is running on the endpoint that is located in the particular geographic region.

17. The method of claim 14, wherein:
the workload comprises a first workload associated with a first customer account;
the endpoint is running a second workload associated with a second customer account;
the first trigger value includes a threshold resource usage value ratio for the first workload consuming computing resources of the endpoint compared to the second workload consuming the computing resources of the endpoint; and
the current value of the dynamic operating attribute of the workload comprises a current resource usage ration of the first workload that is equal to or greater than the threshold resource usage ratio.

18. The method of claim 14, wherein:
the first trigger value includes a threshold latency value associated with performance of the workload; and
the current value of the dynamic operating attribute of the workload indicates that a current latency value for the workload is greater than or equal to the threshold latency value.

19. The method of claim 14, wherein the dynamic operating attribute comprises a first dynamic operating attribute and the current value comprises a first current value, and the method further comprising:

receiving, at the software agent and from the SDN controller, a third indication of a second dynamic operating attribute associated with the workload and a third trigger value associated with the second dynamic operating attribute, wherein the third trigger value is associated with the second policy;

sending, to the SDN controller and from the software agent, a fourth indication that a second current value of the second dynamic operating attribute of the workload corresponds to the third trigger value; and wherein the receiving the second policy at the software agent is based at least on at least one of:
the first current value corresponding to the first trigger value or the second trigger value; or
the second current value corresponding to the third trigger value.

20. The method of claim 14, wherein:
the first trigger value includes a range of values indicating a time of day associated with the performance of the workload; and
the current value of the dynamic operating attribute of the workload indicates that a current time of day for the workload is within the range of values indicating the time of day associated with the workload.

* * * * *